United States Patent

Matsuyama et al.

[11] Patent Number: 5,831,701
[45] Date of Patent: Nov. 3, 1998

[54] LIQUID CRYSTAL DISPLAY DEVICE WITH WIDE VIEWING ANGLE CHARACTERISTICS COMPRISING HIGH RESISTIVITY BLACK MATRIX

[75] Inventors: Shigeru Matsuyama; Hiroaki Asuma; Masato Shimura; Yoshifumi Tomita, all of Mobara; Sukekazu Aratani, Hitachi, all of Japan

[73] Assignee: Hitachi, Ltd., Tokyo, Japan

[21] Appl. No.: 659,650

[22] Filed: Jun. 6, 1996

[30] Foreign Application Priority Data

Jun. 14, 1995 [JP] Japan .................................... 7-147720
Jul. 27, 1995 [JP] Japan .................................... 7-191994
Jul. 27, 1995 [JP] Japan .................................... 7-192004

[51] Int. Cl.$^6$ ................... G02F 1/36; G02F 1/1333; G03F 9/00
[52] U.S. Cl. ................... 349/110; 349/44; 349/111; 430/7
[58] Field of Search .................................... 349/110, 111, 349/44; 430/7

[56] References Cited

U.S. PATENT DOCUMENTS

| | | | |
|---|---|---|---|
| 4,308,319 | 12/1981 | Michelotti et al. | 428/432 |
| 5,412,494 | 5/1995 | Ishiwata et al. | 349/111 |
| 5,558,927 | 9/1996 | Aruga et al. | 430/70 |
| 5,598,285 | 1/1997 | Kondo et al. | 349/42 |

*Primary Examiner*—William L. Sikes
*Assistant Examiner*—Toan Ton
*Attorney, Agent, or Firm*—Antonelli, Terry, Stout & Kraus, LLP

[57] ABSTRACT

A liquid crystal display device comprising a black mask formed on one of a pair of substrates at least one of which is transparent, a group of electrodes formed on at least one of the pair of substrates, a liquid crystal layer comprising a liquid crystal composition substance having a dielectric anisotropy and held between the pair of substrates, an orientation control film formed between the liquid crystal layer and one of the substrates for orienting liquid crystal molecules of the liquid crystal composition substance in a predetermined direction, a polarizer laminated on at least one of the pair of substrates, and a driver for applying a drive voltage to the group of electrodes, wherein the group of electrodes has a structure that the electrodes are so arranged as to generate an electric field having a component predominantly in parallel with the interface between the orientation control film and the liquid crystal layer, the liquid crystal composition substance has a resistivity of not smaller than $10^N$ Ω·cm, and the black mask has a resistivity of not smaller than $10^M$ Ω·cm, wherein N and M are integers satisfying the relationships $N \geq 9$ and $M \geq 6$.

12 Claims, 13 Drawing Sheets

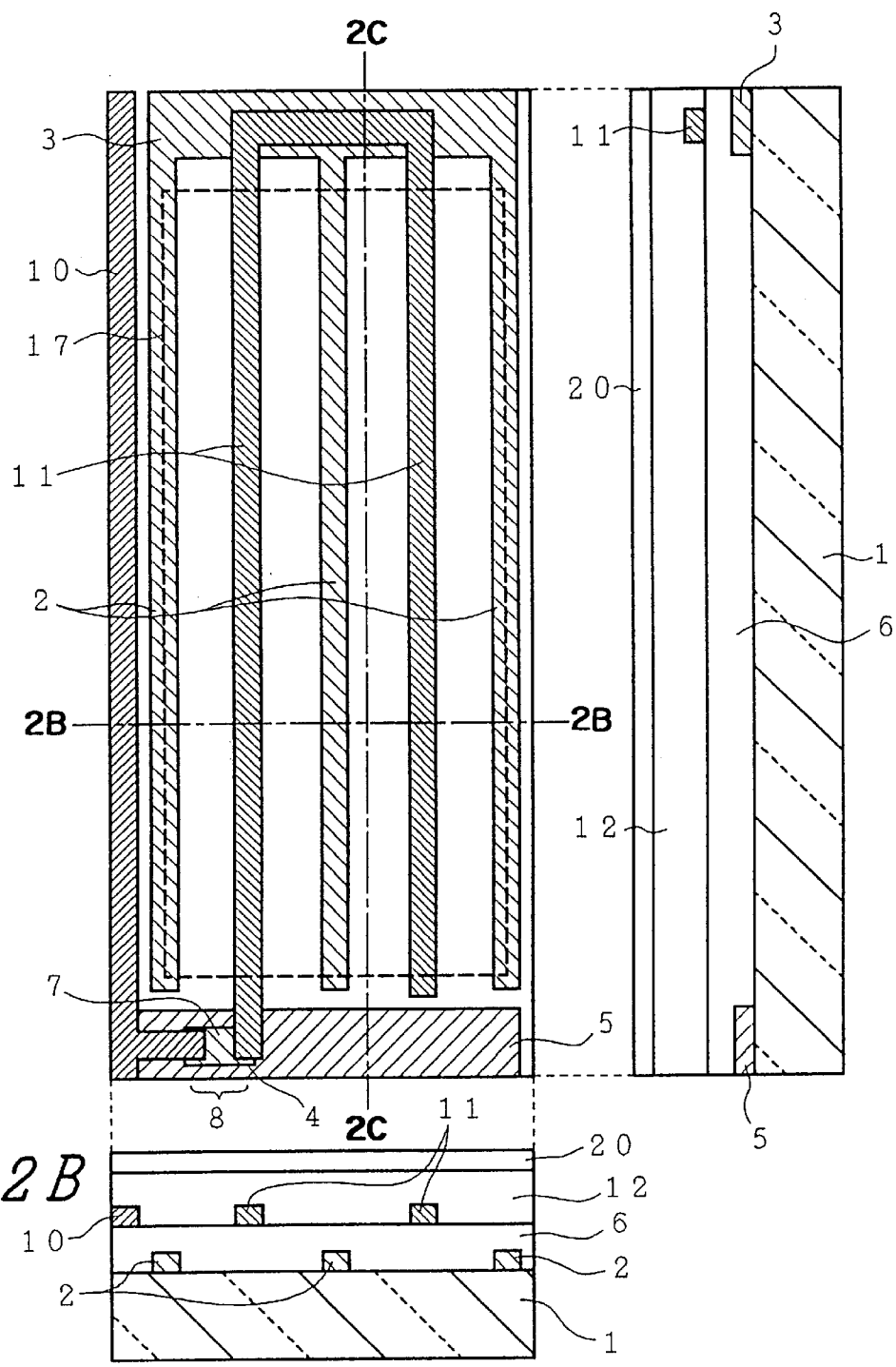

Carbon Amount in BM
(Relative Value)

LIQUID CRYSTAL DISPLAY DEVICE WITH WIDE VIEWING ANGLE CHARACTERISTICS COMPRISING HIGH RESISTIVITY BLACK MATRIX

BACKGROUND OF THE INVENTION

1. Field of the Invention

The present invention relates to a liquid crystal display device and, particularly, to an active matrix liquid crystal display device of a high picture quality with wide viewing angle characteristics comprising high resistivity black matrix and with excellent light-shielding ability.

2. Description of the Prior Art

Display devices using a liquid crystal display device having reduced thickness and reduced weight and consuming decreased amounts of electric power have in recent years been widely used for personal computers, word processors and other information equipment.

Basically, the liquid crystal display device has a matrix made up of a number of electrodes arranged horizontally and vertically and a liquid crystal layer interposed between the horizontal electrodes and the vertical electrodes, and pixels are formed at the portions where two electrodes intersect each other to display a two-dimensional picture.

The liquid crystal display devices of this kind can be divided into those of a so-called passive matrix system which selects a predetermined pixel at a timing of a pulse applied to horizontal and vertical electrodes, and those of a so-called active matrix system in which a nonlinear element such as transistor or the like is provided in each pixel and a predetermined nonlinear element is selected.

In a liquid crystal display device of the active matrix system, non-linear elements (switching elements) are provided at positions corresponding to a plurality of pixel electrodes arranged in the form of a matrix. Theoretically, the liquid crystal in each pixel is driven at all times (duty ratio of 1.0). Compared with the so-called passive matrix system employing a time-division multiplex driving system, therefore, the active matrix system exhibits a good contrast and has been establishing a technique that is indispensable particularly in the color liquid crystal display devices. Thin-film transistors (TFTs) are representative examples of the switching elements.

In a conventional thin-film transistor liquid crystal display element, transparent electrodes are so formed as to face each other on the interface of two substrates to drive the liquid crystal layer.

That is, there has been employed a display system as represented by a so-called twisted nematic display system in which the direction of the electric field applied to the liquid crystals is almost perpendicular to the interface of the substrates owing to the employment of the above-mentioned electrode structure.

As a system in which the direction of an electric field applied to the liquid crystals is almost in parallel with the interface of the substrates, furthermore, there has been proposed a system (so-called an inplane electric field system) employing a pair of comb-toothed electrodes formed on the surface of at least one of the substrates for driving the liquid crystal layer as disclosed in, for example, Japanese Patent Publication No. 21907/1988 and Japanese Patent Laid-Open No. 36058/1995. The method of setting comb-toothed electrodes and the method of its fabrication have been proposed already by the present applicant in Japanese Patent Application No. 105862/1995.

In such an electrode structure, the major axes of molecules of the liquid crystal layer (hereinafter also referred to simply as liquid crystal molecules) are substantially in parallel with the surfaces of the substrates, and the liquid crystal molecules are suppressed from being erected in a direction perpendicular to the substrates. Therefore, the brightness changes little even when the viewing angle is changed; i.e., the so-called viewing angle dependence does not almost exist, and wide viewing angle characteristics are accomplished compared with those of the vertical electric field system.

In a conventional black mask interposed among the colored layers of various colors and constituting the substrate (color-filter substrate) of a color filter, furthermore, a pattern of thin film of metal chromium or low-reflection metal chromium has been formed. Or, a pattern of a thin layer of a photosensitive resin has been formed, dispersing a black coloring agent, or black carbon powder (chiefly graphite) therein, and adding various pigments thereto.

The colored layers of the color-filter substrate usually have a structure in which a protective layer PSV2 is formed on the colored layers FIL(R), FIL(G), FIL(B) of which the pattern regions are separated like a mosaic or vertical stripes for each of the pixels or colors.

When the colored layers are fabricated by using pigment-dispersed resin materials in the color filter used for the active matrix-type liquid crystal display devices, furthermore, the protective layer PSV2 is not often employed.

FIG. 13 is a schematic sectional view illustrating the constitution of a pixel that constitutes an inplane electric field-type liquid crystal display device and illustrating the turn-on operation, wherein reference numeral 1 denotes a TFT substrate, 1' denotes a color-filter substrate, 2 denotes a common electrode, 6 denotes an insulating film, 11 denotes pixel electrodes, 12 denotes a protective film, 17 denotes a black mask, and 18 denotes a color filter.

In FIG. 13, a liquid crystal layer is held between the TFT substrate 1 and the color filter substrate 1'. On the surfaces of the protective film 12 and of the color filter 18 are formed orientation films for establishing the initial orientation of liquid crystal molecules of the liquid crystal layer. Moreover, though not shown in FIG. 13, polarizer plates are installed on the outer surface sides of the TFT substrate 1 and the color filter substrate 1'.

In the above mentioned inplane electric field liquid crystal display device, the pixel electrodes 11 and the common electrode 2 are formed on one substrate (TFT substrate 1), and on the other substrate (color-filter substrate 1') is formed a color filter 18 that constitutes a color of a pixel demarcated by the black mask 17.

The black mask 17 demarcating the color filter prevents the reflection of external light and enhances the contrast by absorbing light from the neighboring pixels.

SUMMARY OF THE INVENTION

In a conventional vertical electric field liquid crystal display device having a common electrode formed on the side of the color-filter substrate, the black mask constituting the color-filter substrate is required to have a high light absorption factor and a low light reflection factor. However, no consideration concerning the resistivity of the black mask has been taken.

That is, in the above-mentioned black mask using a resin material, a large amount of graphite is added particularly to improve the absorption factor. Therefore, the resistivity decreases with an increase in the amount of graphite added. When metal chromium is used for the black mask, furthermore, the light-shielding ability is improved greatly and the resistivity becomes very small.

In the inplane electric field-type liquid crystal display device in which the black mask has a small resistivity, however, the lines of electric force from the pixel electrodes 11 are attracted by the black mask 17 having a small resistivity, as shown in FIG. 13, when a voltage is applied between the pixel electrodes 11 and the common electrode 2 to turn the pixel on, and the pattern of electric field is disturbed and tilted with respect to the interface of the substrates. As a result, the horizontal component of the lines of electric force is weakened, and a desired light transmission factor is not obtained. Alternatively, so-called domains occur at positions of the pixel electrodes 11 and the common electrode 2. Accordingly, the contrast is degraded, color display becomes nonuniform, and a good picture quality is not obtained.

FIGS. 14A and 14B are schematic diagrams illustrating a pixel in an inplane electric field liquid crystal display device having two comb-toothed common electrodes arranged in a pixel. FIG. 14A is a plan view and FIG. 14B is a sectional view cut along the line 14B—14B' in FIG. 14A. A color filter is formed on a portion surrounded by the black mask 17, and various films are formed thereon and on the common electrodes 2 and on the pixel electrodes 11, which, however, are not shown here.

In FIGS. 14A and 14B, a pixel is formed in an open region surrounded by the black mask, a pixel electrode 11 and a common electrode 2 are arranged in this region, and a liquid crystal layer is held between the TFT substrate 1 and the color filter substrate 1'. The black mask has a resistivity of not larger than $10^4$ Ω·cm.

By a signal voltage applied for turn on, an electric field is generated between the common electrode 2 and the neighboring pixel electrode 11. This electric field acts strongly upon the liquid crystal molecules depending upon the magnitude of the applied signal voltage, whereby the orientation of liquid crystal molecules rotates and light passes from the TFT substrate 1 to the color-filter substrate 1' at an increased transmission factor.

FIG. 15 is a diagram illustrating the transmission factor that varies depending upon the position in the gap between the common electrode 2 and the pixel electrode 11 shown in FIG. 14A, wherein a spot a denotes a position away from the black mask 17 and a spot b denotes a position close to the black mask 17.

As shown, the transmission factor increases with an increase in the signal voltage applied between the common electrode 2 and the pixel electrode 11. As shown in FIG. 14A, however, since the spot b is located close to the black mask 17, the electric field pattern is formed at a sharp angle with respect to the surface of the substrate. Accordingly, in a change in the transmission factor with an increase in the voltage, the rise is behind that of the spot a. In FIG. 15, the voltage of the spot b must be increased by about one volt with respect to the spot a to obtain the same transmission factor.

When the same voltage is applied, therefore, the transmission factor differs between the central portion and the peripheral portion in a pixel, and the color becomes nonuniform.

The object of the present invention is to provide a liquid crystal display device of a so-called inplane electric field device having an improved light-shielding ability, suppressing disturbance of the pattern of electric field, and displaying a picture of high quality without nonuniformity in color.

In order to accomplish the above-mentioned object, means 1 is characterized in that, a liquid crystal display device comprises a black mask formed on one of a pair of substrates at least one of which is transparent, a group of electrodes formed on at least one of the pair of substrates, a liquid crystal layer comprising a liquid crystal composition substance having a dielectric anisotropy and held between the pair of substrates, an orientation control film formed between the liquid crystal layer and one of the substrates for orienting the liquid crystal molecules of the liquid crystal composition substance in a predetermined direction, a polarizing means laminated on at least one of the pair of substrates, and a drive means for applying a drive voltage to the group of electrodes, wherein the group of electrodes has a structure that the electrodes are so arranged as to generate an electric field having a component predominantly in parallel with the interface between the orientation control film and the liquid crystal layer, said liquid crystal composition substance has a resistivity of not smaller than $10^N$ Ω·cm, and said black mask has a resistivity of not smaller than $10^M$ Ω·cm, wherein N and M are integers satisfying the relationships N≧9 and M≧6.

Means 2 is characterized in that a liquid crystal display device comprises a black mask formed on one of a pair of substrates at least one of which is transparent, a group of electrodes formed on at least one of the pair of substrates, a liquid crystal layer comprising a liquid crystal composition substance having a dielectric anisotropy and held between the pair of substrates, an orientation control film formed between the liquid crystal layer and one of the substrates for orienting the liquid crystal molecules of the liquid crystal composition substance in a predetermined direction, a polarizing means laminated on at least one of the pair of substrates, and a drive means for applying a drive voltage to the group of electrodes, wherein the group of electrodes has a structure that the electrodes are so arranged as to generate an electric field having a component predominantly in parallel with the interface between the orientation control film and the liquid crystal layer, said liquid crystal composition substance has a resistivity of not smaller than $10^N$ Ω·cm, and said black mask has a resistivity of not smaller than $10^M$ Ω·cm, wherein N and M are integers satisfying the relationships N≧13 and M≧7.

Means 3, according to means 1 or 2, is characterized in that metal oxide particles are contained in the black mask.

Means 4, according to means 3, is characterized in that metal oxide particles are particles of at least one of cobalt oxide, chromium oxide, manganese oxide and nickel oxide.

Means 5, according to means 3, is characterized in that either or both of an organic pigment and a graphite powder are contained in the black mask in addition to the metal oxide particles.

Means 6, according to means 4, is characterized in that the cobalt oxide particles are chiefly tricobalt tetroxide particles.

Means 7, according to means 4, is characterized in that any one of chromium oxide, manganese oxide and nickel oxide is contained in addition to the cobalt oxide.

Means 8, according to means 1 or 2, is characterized in that the black mask contains the polyimide resin as a base material.

Means 9, according to means 8, is characterized in that the base material of the black mask is a resin material having a polyimide group, the composition of the resin material contains a component that is cured by light and a component that is cured by heat, and the optical density increases as the resin material is cured by heat.

Means 10, according to means 8 or 9, is characterized in that the black mask is composed of a polyimide resin material which contains at least one or more kinds of black coloring agents and other coloring agents different from the black coloring agents.

Furthermore, means 11, according to means 8 or 9, is characterized in that the black mask is composed of a polyimide resin material in which metal oxide particles are mixed as a black coloring agent.

In the constitution of the above-mentioned means 1, the black matrix formed on one of the pair of substrates shuts off the entry of light from the neighboring pixels that are turned on, contributing to increasing the contrast of a display image.

The group of electrodes formed on one or both of the pair of substrates comprise a common electrode and a pixel electrode, and forms an electric field pattern between the two electrodes when the pixel is turned on to rotate the orientation of liquid crystal molecules of a liquid crystal composition substance that constitutes the liquid crystal layer, so that the light transmission factor changes. The orientation control film (orientation film) works to orient the liquid crystal molecule of the liquid crystal composition substance in a predetermined direction when no electric field is applied.

The polarizing means is laminated on at least one of the pair of substrates, and permits the passage of light that is polarized in a specific direction before entering into the liquid crystal layer or after having passed through the liquid crystal layer.

The drive means applies a drive voltage to the group of electrodes to turn a predetermined pixel on to display an image.

The group of electrodes has a structure that the electrodes are so arranged as to generate an electric field having a component predominantly in parallel with the interface between the orientation control layer and the liquid crystal layer. When the electric field is generated between the common electrode and the pixel electrode constituting the group of electrodes, the liquid crystal molecules are rotated in a plane substantially in parallel with the interface.

The liquid crystal composition substance has a resistivity of not smaller than $10^N$ $\Omega \cdot cm$ and the black mask has a resistivity of not smaller than $10^M$ $\Omega \cdot cm$ (where N and M are integers) satisfying the relationships $N \geq 9$ and $M \geq 6$, thereby to effectively generate an electric field component in parallel with the substrates.

Accordingly, the liquid crystal molecules rotate in a plane substantially in parallel with the interface, making it possible to suppress the occurrence of so-called domains and the rise of the drive voltage.

In the constitution of means 2, furthermore, the liquid crystal composition substance has a resistivity of not smaller than $10^N$ $\Omega \cdot cm$ and the black mask has a resistivity of not smaller than $10^M$ $\Omega \cdot cm$ (where N and M are integers) satisfying relationships $N \geq 13$ and $M \geq 7$, thereby to more effectively generate an electric field component in parallel with the substrates than that of means 1.

Accordingly, the liquid crystal molecules rotate in a plane substantially in parallel with the interface, making it possible to further suppress the occurrence of so-called domains and the rise of the drive voltage.

In the constitution of means 3, furthermore, metal oxide particles are contained in the black mask formed on one of the pair of substrates at least one of which is transparent. Therefore, the black mask exhibits an increased resistivity yet maintaining an optical density, and the electric field component is more effectively generated between the electrodes in a plane nearly in parallel with the above-mentioned interface.

Accordingly, the liquid crystal molecules rotate in a plane nearly in parallel with the interface, making it possible to suppress the occurrence of so-called domains and the rise in the drive voltage, and enabling the light transmission factor to be improved.

In the constitution of means 4, furthermore, the black mask contains cobalt oxide particles, chromium oxide particles, manganese oxide particles or nickel oxide particles so as to possess an increased optical density and an increased resistivity. Therefore, the electric field component is generated more effectively between the electrodes in a plane in parallel with the above-mentioned interface.

Accordingly, the liquid crystal molecules rotate in a plane nearly in parallel with the interface, making it possible to suppress the occurrence of so-called domains and the rise of the drive voltage, and enabling the light transmission factor to be improved.

In the constitution of means 5, the black mask contains either or both of an organic pigment and a graphite powder in addition to the metal oxide particles so as to possess an increased resistivity and to absorb light more efficiently. Accordingly, the liquid crystal molecules rotate in a plane nearly in parallel with the interface, making it possible to suppress the occurrence of so-called domains and the rise of the drive voltage, and enabling the light transmission factor to be improved.

In the constitution of means 6, tricobalt tetroxide is chiefly used as the cobalt oxide particles so that the black mask maintains the resistivity and the absorbancy.

In the constitution of means 7, any one of chromium oxide, manganese oxide or nickel oxide is contained in addition to the cobalt oxide, so that the black mask maintains the resistivity and the light absorption factor.

In means 8 to 10, use is made of a polyimide photosensitive resin, and a feature that the optical density increases in the step of curing the resin by light and heat is utilized in order to obtain a black mask of nearly a black color having a high insulating property.

That is, in the constitution of means 8, the black mask is comprised of a material which contains a polyimide resin as the base material and has a high resistivity. Therefore, the insulating property is prevented from decreasing, and the electric field component for rotating the liquid crystal molecules is effectively generated in parallel with the interface.

In the constitution of means 9, the black mask is made of a resin material having a polyimide group and containing a component that is cured by light and a component that is cured by heat. Therefore, there is formed a black mask that is colored in black upon the curing by heat, and exhibits a great light-shielding ability.

In the constitution of means 10, the black mask is made of the polyimide resin material that contains at least one or more kinds of black coloring agents and other coloring agents than the above-mentioned black coloring agents. Therefore, the black mask exhibits a great light-shielding ability.

In the constitution of means 11, the black mask is made of the polyimide resin material in which is mixed metal oxide particles as a black coloring agent. Therefore, the black mask exhibits a high resistivity and a great light-shielding ability.

The above-mentioned polyimide-type photosensitive resin has in the molecule skeleton thereof a functional group that absorbs visible rays but does not contain carbon or graphite which has been conventionally contained. It is therefore possible to set a low transmission factor without lowering the resistivity.

The foregoing and other objects, advantages, manner of operation and novel features of the present invention will be understood from the following detailed description when read in connection with the accompanying drawings.

BRIEF DESCRIPTION OF THE DRAWINGS

FIGS. 2A to 2C are diagrams illustrating a structure of a TFT substrate constituting an embodiment of an inplane electric field liquid crystal display device;

DESCRIPTION OF THE PREFERRED EMBODIMENTS

Embodiments of the present invention will now be described in detail with reference to the drawings.

Figure 1A:
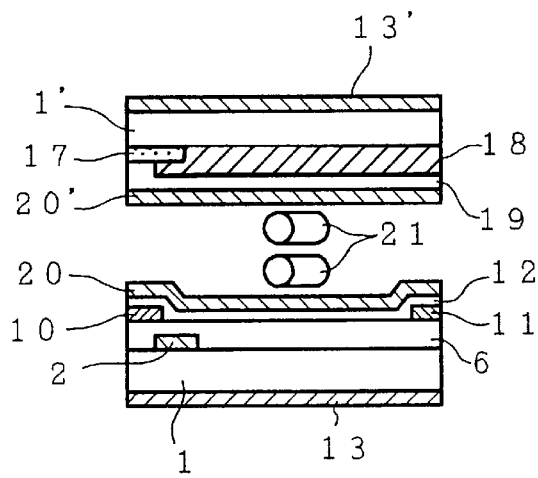
FIGS. 1A to 1D are schematic diagrams of a pixel for explaining the operation of an inplane electric field-type liquid crystal display device.
Figure 1B:
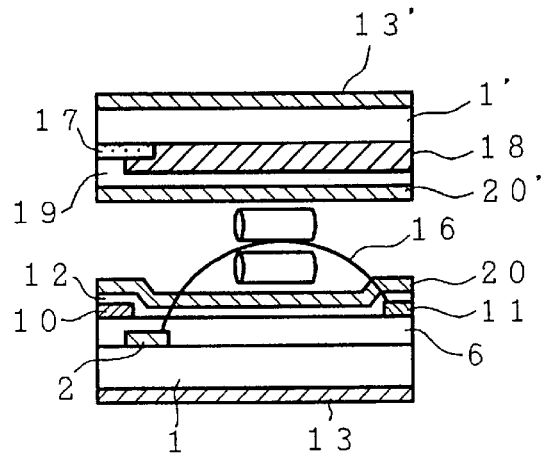
Figure 1C:
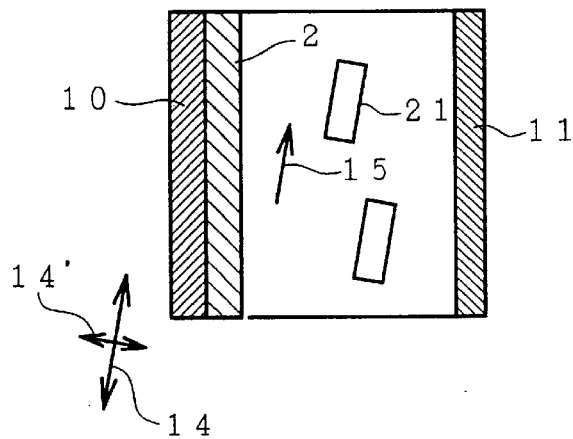
Figure 1D:
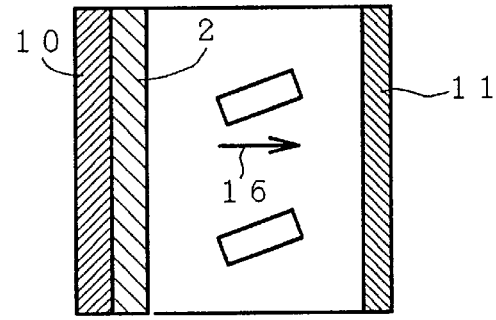

FIGS. 1A to 1D are schematic diagrams of a pixel for explaining the operation of a liquid crystal display device to which the present invention is applied. FIG. 1A is a sectional view of when no voltage is applied, FIG. 1B is a sectional view of when a voltage is applied, FIG. 1C is a plan view of when no voltage is applied, and FIG. 1D is a plan view of when a voltage is applied. The voltage referred to here is a selection voltage applied between the common electrode and the pixel electrode.

In FIGS. 1A and 1B, reference numerals 1 and 1' denote transparent glass substrates (hereinafter also referred to simply as substrates), 2 denotes a common electrode, 6 denotes an insulating film, 10 denotes a signal wiring, 11 denotes a pixel electrode, 12 denotes a protective film, 13 and 13' denote polarizer plates, 14 and 14' denote axes of polarization of the polarizer plates, 15 denotes the orientation of liquid crystal molecules, 16 denotes the direction of an electric field, 17 denotes a black mask (BM), 18 denotes a color filter, 19 denotes a protective film (flattening film), 20 and 20' denote orientation films, and reference numeral 21 denotes liquid crystal molecules (chiefly rod-like liquid crystal molecules).

The liquid crystal display device comprises the polarizer plate 13', black mask 17 for shielding light, color filter 18, protective film 19 and orientation film 20' that are formed on one substrate (color-filter substrate 1') of two transparent glass substrates 1 and 1'. On the other substrate (TFT substrate) 1 via the liquid crystal 21 are formed the polarizer plate 13, orientation film 20, signal electrode 10, pixel electrode 11, common electrode 2, wirings and thin-film transistor (TFT). FIGS. 1A and 1B do not illustrate wirings or thin-film transistors.

Referring to FIGS. 1A and 1C, the liquid crystal molecules 21 are oriented homogeneously by the orientation films 20, 20' in the direction 15 of orientation which is nearly in parallel with the planes of the substrates 1, 1'. In this state, the direction of initial orientation of liquid crystal molecules 21 is nearly in agreement with the axis 14 of polarization of the polarizer plate 13, and the axis 14' of polarization of the upper polarizer plate 13' is perpendicular thereto and the pixel is in a non-display (turned-off) state.

Referring next to FIGS. 1B and 1D, the voltage is applied between the common electrode 2 and the pixel electrode 11 formed on the substrate 1 to form an electric field (the direction 16 of electric field) in a direction nearly in parallel with the interface of the substrates 1, 1'. Then, the liquid crystal molecules 21 are oriented and rotated in a plane nearly in parallel with the interface of the substrates 1, 1'. Accordingly, the pixel is placed in a display (turned-on) state. A large number of pixels are arranged to constitute a display device.

FIGS. 2A to 2C are diagrams illustrating the structure of a TFT substrate which constitutes a liquid crystal display device of an embodiment of the present invention, wherein FIG. 2A is a plan view, FIG. 2B is a sectional view taken along the line 2B—2B' of FIG. 2A, and FIG. 2C is a sectional view taken along the line 2C—2C' of FIG. 2A.

In FIGS. 2A to 2C, the same reference numerals as those of FIGS. 1A to 1D denote the same portions, reference numeral 3 denotes a common wiring, 4 denotes a scanning electrode, 5 denotes a scanning wiring, 6 denotes an insulating film, 7 denotes a semiconductor layer, 8 denotes a thin-film transistor portion (TFT portion), 10 denotes a signal wiring, 11 denotes pixel electrodes, and 12 denotes a protective film.

The scanning electrode 4, scanning wiring 5, common electrodes 2 and common wiring 3 are provided in the same layer and are made of the same material. The semiconductor layer 7 is formed via the thin layer and the insulating film 6, and the signal wiring 10 and the pixel electrode 11 are formed in the same layer using the same material.

Part of the pixel electrode 11 is so arranged as to overlap with the common wiring 3 in a direction perpendicular to the surface of the substrate via the insulating film 6, creating a capacitance to hold a signal voltage that is applied between the pixel electrode 11 and the common electrode 2.

Figure 3:
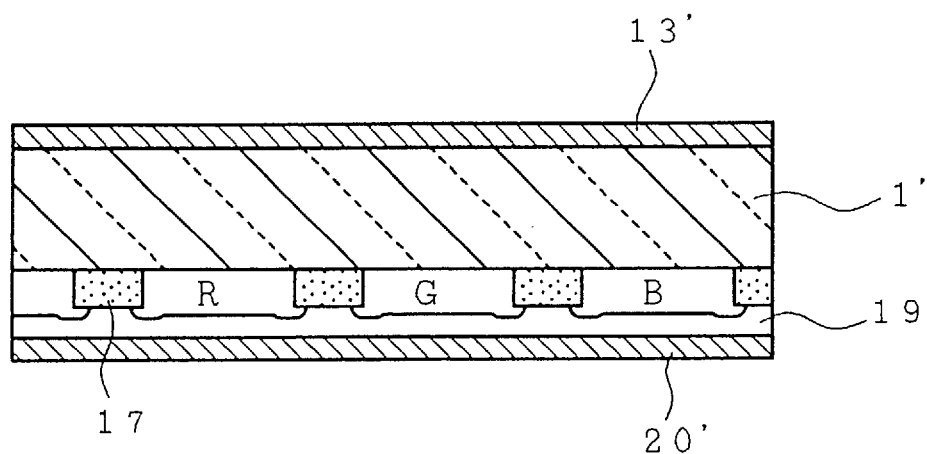
FIG. 3 is a diagram illustrating example 1 or 2 of the structure of a color-filter substrate in the inplane electric field liquid crystal display device.

FIG. 3 is a diagram illustrating an example of the structure of the color-filter substrate constituting the liquid crystal display device according of the embodiment 1 of the present invention, wherein the same reference numerals as those of FIGS. 1A to 1D denote the same portions.

As shown in FIG. 3, the color filter substrate has a plurality of color filters (R G. B) demarcated by the black mask 17 on one surface of the transparent substrate 1', and further has the protective film (smoothing layer) 19 and the orientation film 20' formed thereon. The polarizer plate 13' is deposited on the other surface of the transparent substrate 1'.

When the liquid crystal layer has a resistivity of not smaller than $10^N$ $\Omega$·cm, the black mask 17 demarcating a plurality of color filters R, G and B must have a resistivity of not smaller than $10^M$ $\Omega$·cm, satisfying the relationships $N \geq 9$ and $M \geq 6$, where N and M are integers.

When the liquid crystal layer and the black mask have such resistivities, the electric field pattern formed by the selection voltage applied between the common electrode and the pixel electrode has an effectively increased component nearly in parallel with the interface between the liquid crystal layer and the orientation film, and makes it possible to suppress the rise of the drive voltage. Furthermore, occurrence of domains is greatly decreased, and high-contrast display is obtained.

Figure 4:
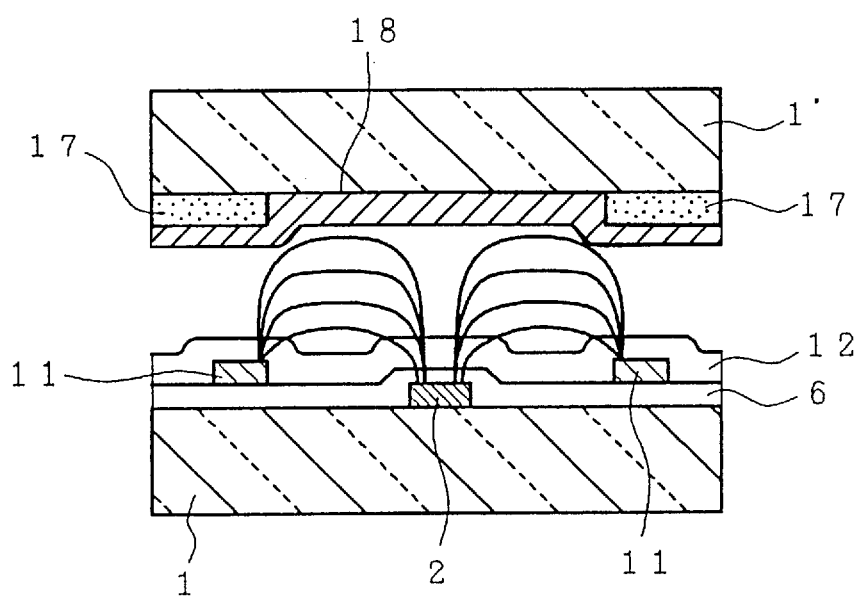
FIG. 4 is a schematic diagram of an electric field pattern in a pixel in cross section constituting the embodiment 1 or 2 of the inplane electric field liquid crystal display device.

FIG. 4 is a sectional view schematically illustrating an electric field pattern of a pixel that constitutes the liquid crystal display device of the embodiment 1 according to the present invention, wherein the lines of electric force generated between the common electrode 2 and the pixel electrodes 11 are not affected by the black mask 17, the electric field pattern is nearly in parallel with the interface between the liquid crystal layer and the orientation film, occurrence of domains is greatly decreased at the positions of the pixel electrodes 11 and at the position of the common electrodes 2, the transmission factor is enhanced in the open region of the pixel, and a high-contrast display is obtained.

The same effects are produced even when the liquid crystal layer has a resistivity of not smaller than $10^N$ $\Omega$·cm and the black mask has a resistivity of not smaller than $10^M$ $\Omega$·cm (N and M are integers), satisfying the relationships $N \geq 13$ and $M \geq 7$.

In embodiment 1, the material of the black mask is blended with a mixture of an organic pigment and carbon; i.e., the amount of carbon is adjusted so that the above-mentioned desired resistivity is obtained.

Figure 5:
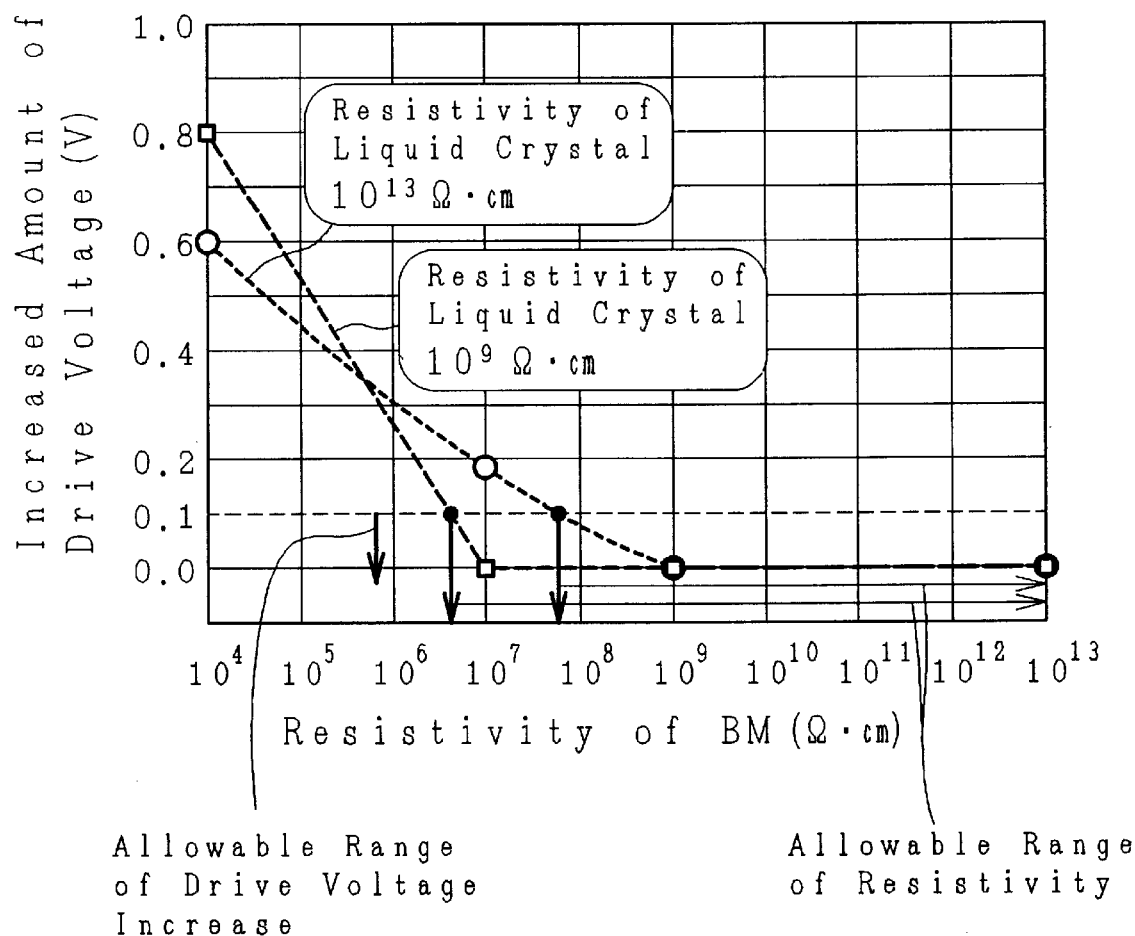
FIG. 5 is a diagram illustrating a rise of the drive voltage relative to the resistivity of the black mask of when the resistivity of the liquid crystal layer of the inplane electric field liquid crystal display device is changed.

FIG. 5 is a diagram illustrating the drive voltage relative to the resistivity of the black mask of when the resistivities of the liquid crystal layer and of the black mask of the aforementioned embodiment 1 are changed.

In FIG. 5, assuming that the allowable value of drive voltage increase relative to the allowable value of transmissivity change, which should be less than one gray scale level, is not larger than 0.1 volt, the resistivity of the black mask must be higher than $3 \times 10^6$ $\Omega$·cm when the liquid crystal has a resistivity of $10^9$ $\Omega$·cm, and the resistivity of the black mask must be higher than $5 \times 10^7$ $\Omega$·cm when the liquid crystal has a resistivity of $10^{13}$ $\Omega$·cm.

From these facts, the aforementioned effects are obtained by determining the values M and N satisfying the relationships $N \geq 9$ and $M \geq 6$ or $N \geq 13$ and $M \geq 7$.

When the black mask contains carbon, the resistivity decreases with an increase in the amount of carbon that is contained and increases with a decrease in the amount of carbon. An increase in the amount of carbon results in an increase in the optical density (hereinafter referred to as OD value). However, since carbon is electrically conductive, it decreases the resistivity.

That is, the amount of carbon must be so set as to satisfy the above-mentioned mutually conflicting requirements.

Figure 6:
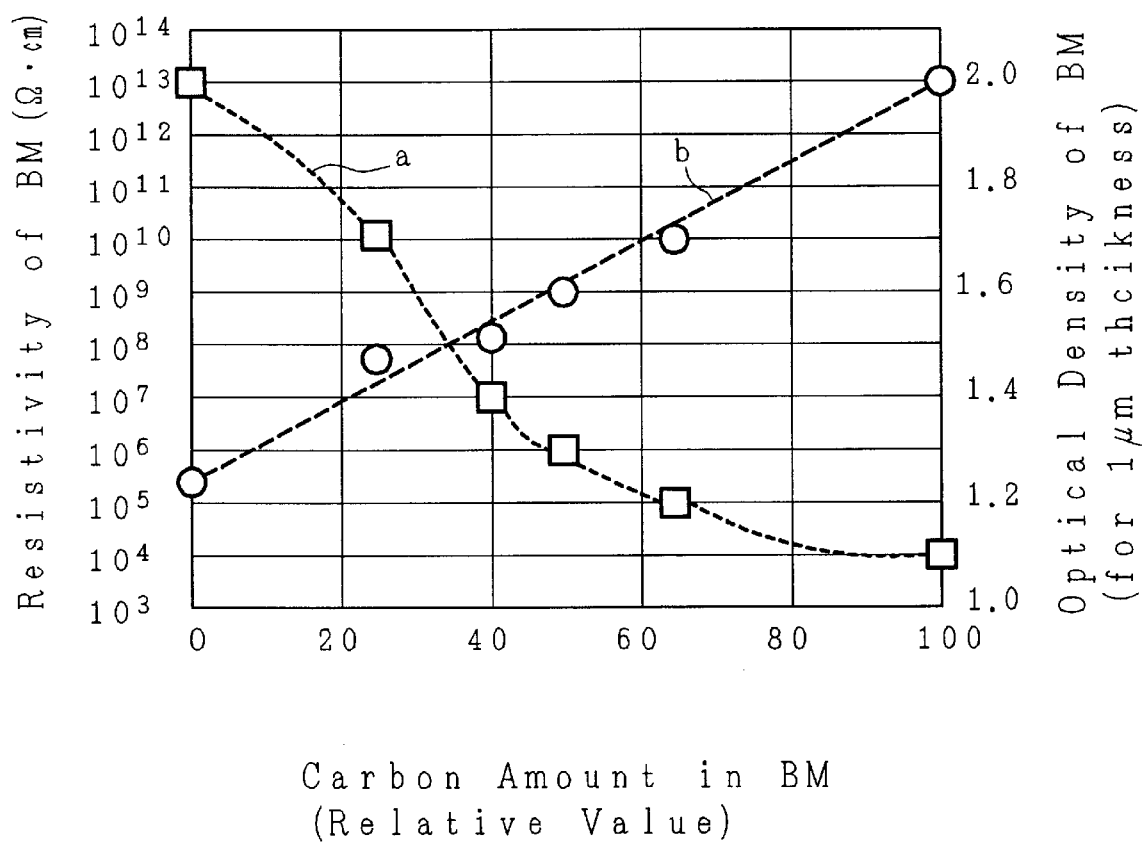
FIG. 6 is a diagram illustrating a change in the resistivity of the black mask relative to the content of carbon therein and a change in the optical density of when the film thickness is 1 μm, in the embodiment 1 of the present invention.

FIG. 6 is a diagram illustrating a relationship between the resistivity change of the black mask depending upon the amount of carbon and the OD value of the black mask of when the film thickness is 1 $\mu$m, wherein curve a represents the resistivity of the black mask, and curve b represents the OD value.

In FIG. 6, the abscissa represents the amount of carbon (relative value) in the black mask, the ordinate of the left side represents the resistivity ($\Omega$·cm) of the black mask and the ordinate of the right side represents the OD value of when the film thickness is 1 $\mu$m From the relationship between the resistivity that varies depending upon the amount of carbon and the optical density (OD value) shown in FIG. 6, it is understood that the resistivity of the black mask becomes not smaller than $10^6$ $\Omega$·cm when the relative amount of carbon is about 50, and the OD value can be determined to be more than 1.6 which is practically satisfactory.

As described earlier, the material of the black mask contains a mixture of organic pigment and carbon, and the mixing ratio of carbon is adjusted to accomplish the resistivity that lies within the above-mentioned range. The present invention, however, is in no way limited thereto only but a desired resistivity can be accomplished by using other light-absorbing materials.

That is, in another embodiment 2 as shown in FIG. 3, the black mask 17 demarcating a plurality of color filters R, G, B can be formed by a known lithographic method by using a resist that contains particles of a tricobalt tetroxide ($Co_3O_4$) as particles of cobalt oxide.

It is further possible to use a resist that contains tricobalt tetroxide and either or both of an organic pigment and carbon (chiefly graphite).

It is further possible to use a resist containing any one of chromium oxide, manganese oxide and nickel oxide.

The mixing ratio of the components of the resist is so adjusted that the black mask 17 has a resistivity of not smaller than $10^6$ $\Omega$·cm.

Since the metal oxide particles such as cobalt oxide particles are contained in the black mask, the light absorption factor can be further increased, maintaining a large resistivity of the black mask. Then, the liquid crystal molecules rotate in a plane nearly in parallel with the interface, making it possible to suppress the occurrence of so-called domains and the rise of the drive voltage and enabling the light transmission factor to be enhanced.

Figure 7:
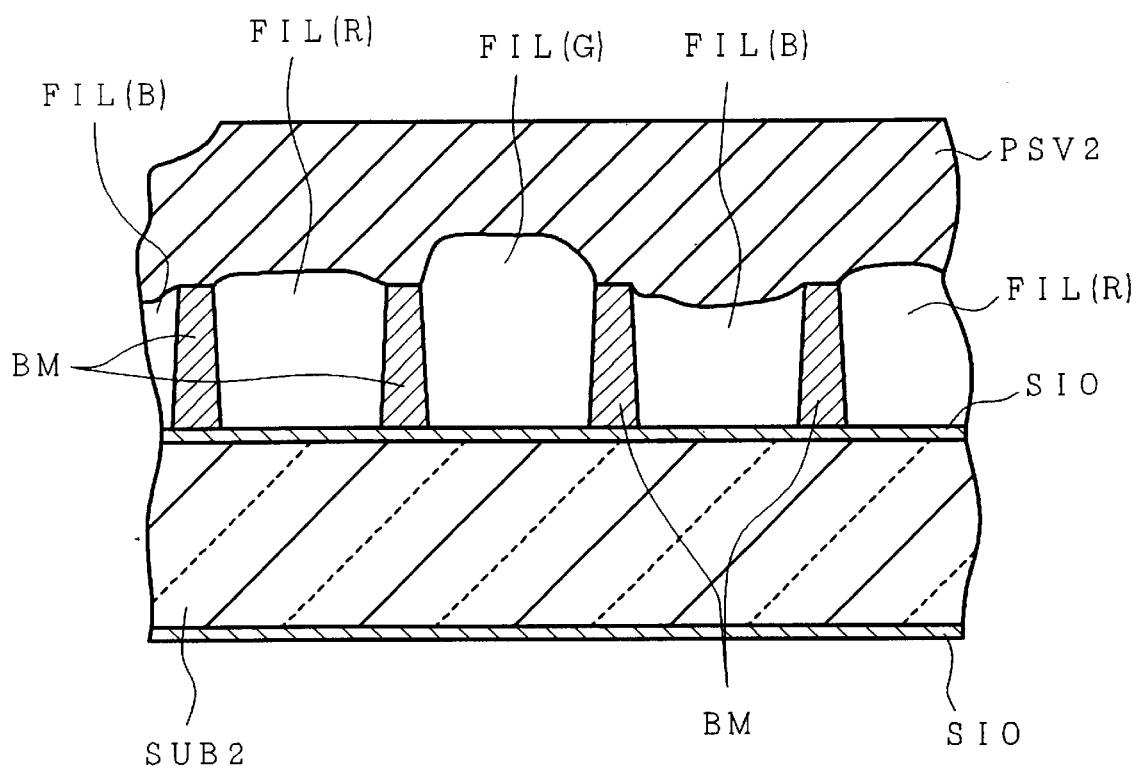
FIG. 7 is a sectional view illustrating an essential portion of the color-filter substrate used in the embodiment 3 of the inplane electric field color liquid crystal display device.

FIG. 7 is a sectional view illustrating an essential portion of the color-filter substrate used in a further embodiment 3.

The color filters of FIG. 7 have the black mask BM made of a polyimide-type resin and formed on the glass substrate SUB2; i.e., color filters (pixels) FIL(R), FIL(G) and FIL(B) demarcated by the black mask BM are provided.

Figure 8:
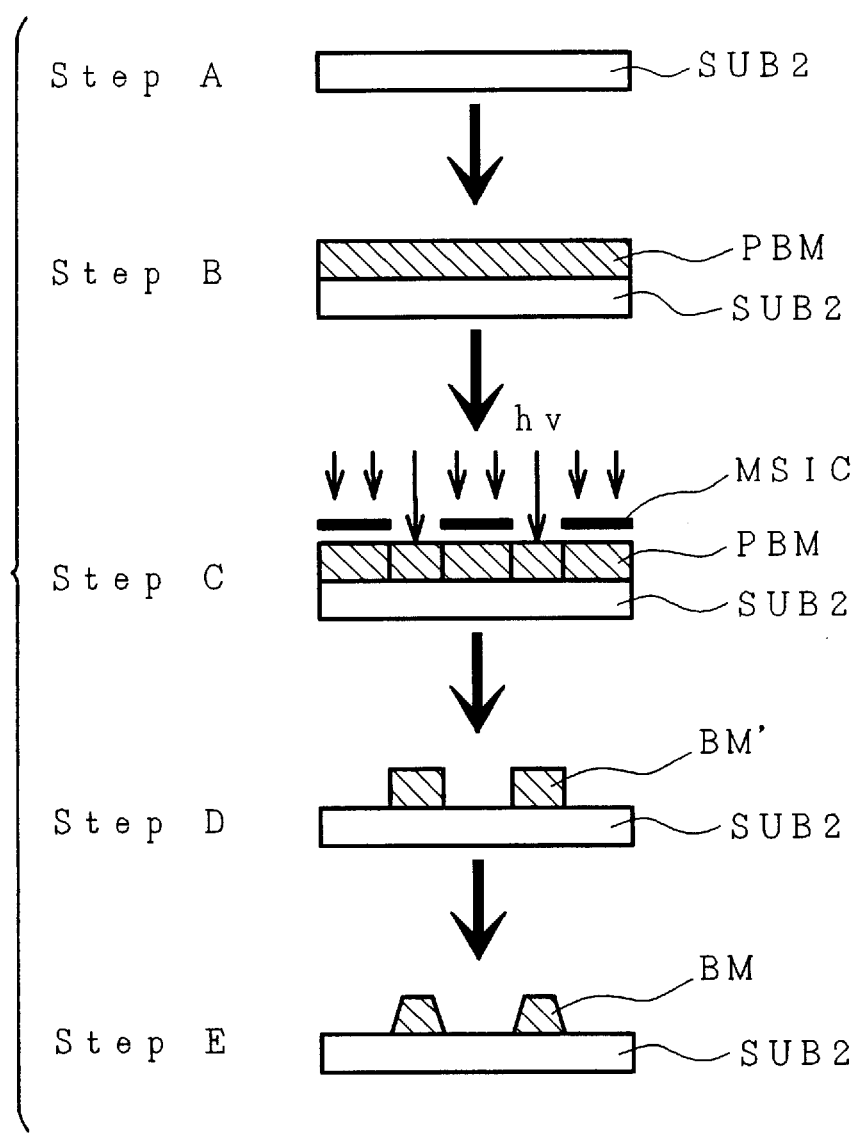
FIG. 8 is a diagram schematically illustrating the steps of forming the black mask shown in FIG. 7.

FIG. 8 is a diagram schematically illustrating the steps of forming the black mask shown in FIG. 7, wherein PBM denotes a polyimide photosensitive resin film, MSIC denotes a photomask for exposing the black mask, hv denotes ultraviolet rays, and BM' denotes a black mask pattern.

The above-mentioned polyimide photosensitive resin is, for example, a photosensitive polyimide resin Ddp-1120(s) (trade name) manufactured by Nitto Denko Corp.

In FIG. 8, a glass substrate SUB2 that serves as a color-filter substrate is prepared (step A), and a polyimide photosensitive resin film PBM is uniformly applied onto the glass substrate SUB2 by a spin-coating method (step B).

The polyimide photosensitive resin film PBM is prebaked at about 70° C. for about 15 minutes and is dried.

Next, ultraviolet rays hv are applied via a photomask MSK having openings corresponding to the pattern of arrangement of black masks (step C). Here, the energy for the exposure is about 500 mJ/cm². Due to the exposure, the portions irradiated with ultraviolet rays undergo the crosslinking reaction and the resin is cured.

After the exposure, the polyimide photosensitive resin film PBM is heat-treated in an oven at 180° C. for 10 minutes or on a hot plate 180° C. for two minutes.

Due to the heat-treatment, the density of the polyimide photosensitive resin film PBM increases and the film PBM exhibits increased light-shielding ability.

After the heat-treatment, the polyimide photosensitive resin film PBM is developed with a developing solution to remove the portions that are not irradiated with ultraviolet rays, whereby a black mask pattern BM' made of the polyimide resin is formed (step D).

Finally, the black mask pattern BM' is cured at 350° C. to 400° C. for about one hour to form the black mask BM (step E).

The processing conditions in the above-mentioned steps are merely examples and can be changed depending upon the thickness of the film that is applied and the blackness that is required.

The polyimide resin film is blackened by being cured by heat in the step of heat-treatment after the exposure to light. The principle of blackening has been disclosed in Omote Toshihiko, Hayashi Shunnichi, Fujii Hirobumi, "Polymer Preprints, Japan", Vol. 41, No. 7, 1992, pp. 2836–2838.

As described earlier, the material constituting the black mask is the polyimide resin not containing electrically conductive material. Therefore, the black matrix exhibits a large resistance.

Then, the pixels (RGB) are formed. As required, furthermore, a flattening film or a protective layer is formed thereon to obtain a color-filter substrate.

In the inplane electric field liquid crystal element described earlier, the opposing electrodes are not required on the side of the color-filter substrate.

Next, a process for forming color filters of various colors on the color-filter substrate having a black mask formed by the above-mentioned processing will be described below.

Figure 9:
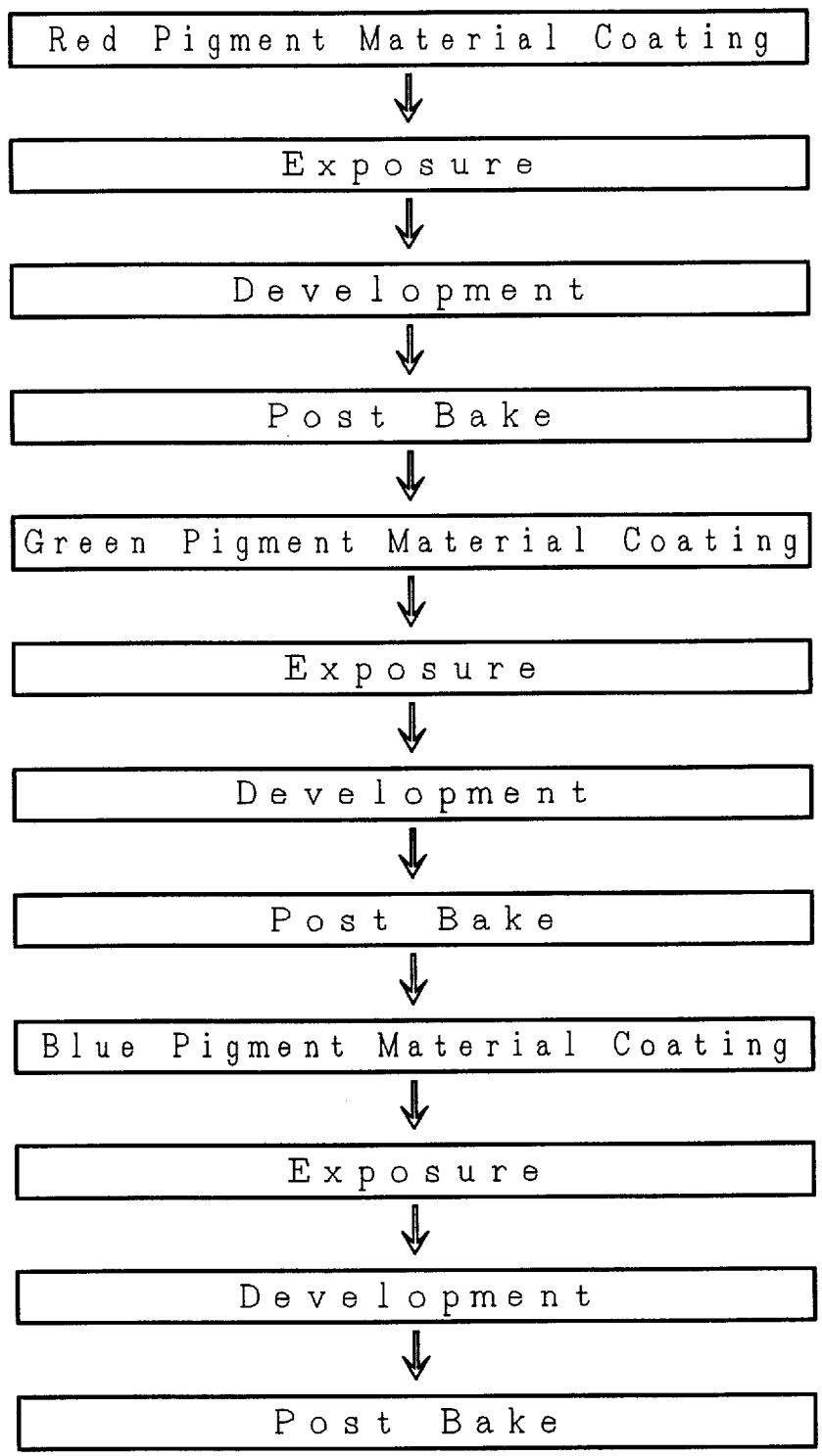
FIG. 9 is a diagram illustrating the steps of fabricating the color-filter substrate shown in FIG. 7.

FIG. 9 is a diagram illustrating the steps of producing the color-filter substrate used for the color liquid crystal display device according to the embodiment 3.

First, the black matrix is formed on the glass substrate, using the process explained with reference to FIG. 8.

The pattern of the black mask serves as a reference of the whole dimensional precision and for forming the color filters (pixels).

The thickness of the black mask is determined depending upon the optical properties thereof, i.e., depending upon the light-shielding ability. In the embodiment 3, the thickness of the black mask is about 1.0 to about 1.5 μm.

A red pigment-dispersed resin material is applied by spin-coating or the like method onto the substrate on which the black mask has been formed, and is exposed to ultraviolet rays via an exposure mask having an opening corresponding to the red filter. The material is developed to leave the exposed portions, cured and dried by postbaking to form a red filter FIL(R).

Next, a green pigment-dispersed resin material is applied by spin-coating or the like method, and is exposed to ultraviolet rays via an exposure mask having an opening corresponding to the green filter. The material is developed to leave the exposed portions, cured and dried by postbaking to form a green filter FIL(G).

Similarly, a blue pigment-dispersed resin material is applied by spin-coating or the like method, and is exposed to ultraviolet rays via an exposure mask having an opening corresponding to the blue filter. The material is developed to leave the exposed portions, cured and dried by postbaking to form a blue filter FIL(B).

Through these steps, color filters of three colors demarcated by the black mask BM are formed.

According to the embodiment 3, the black mask formed among the pixels exhibit a high light absorption factor, making it possible to provide a color liquid crystal display device having an excellent contrast and a high reliability.

In this embodiment, when the black mask has a resistivity of not smaller than $10^7$ Ω·cm, a coloring agent may be added to the color-filter material to control the transmission factor.

The coloring agents to be added to the resin-type black mask material may be graphite, carbon, red, green and blue pigments,or metal oxide particles.

Among the above-mentioned coloring agents, pigments have little electrical conductivity. Therefore, addition of the pigments makes it possible to compensate for low absorption factor among the spectral characteristics of the polyimide-type resin.

An increase in the amount of graphite or carbon to increase the light-shielding ability results in an increase in the electric conductivity. Therefore, limitation is imposed on the amount of their addition.

The amount of addition, however, also varies depending upon the resistance of the resin that is used, the resistance of the material that is added, and the size (particle diameter).

In particular, graphite and carbon have high light-shielding ability and are preferable for increasing the OD (optical density) value.

As the black coloring agent, furthermore, use is made of metal oxide particles such as of the aforementioned cobalt oxide, chromium oxide, manganese oxide or nickel oxide, thereby to form a black mask that exhibits a high light absorption factor, a light-shielding ability and a high resistivity.

According to the embodiment 3 as described above, the color-filter substrate is fabricated by using the polyimide photosensitive resin to provide a color liquid crystal surface having a high contrast.

A more specific constitution of the present invention will be described.

Figure 10:
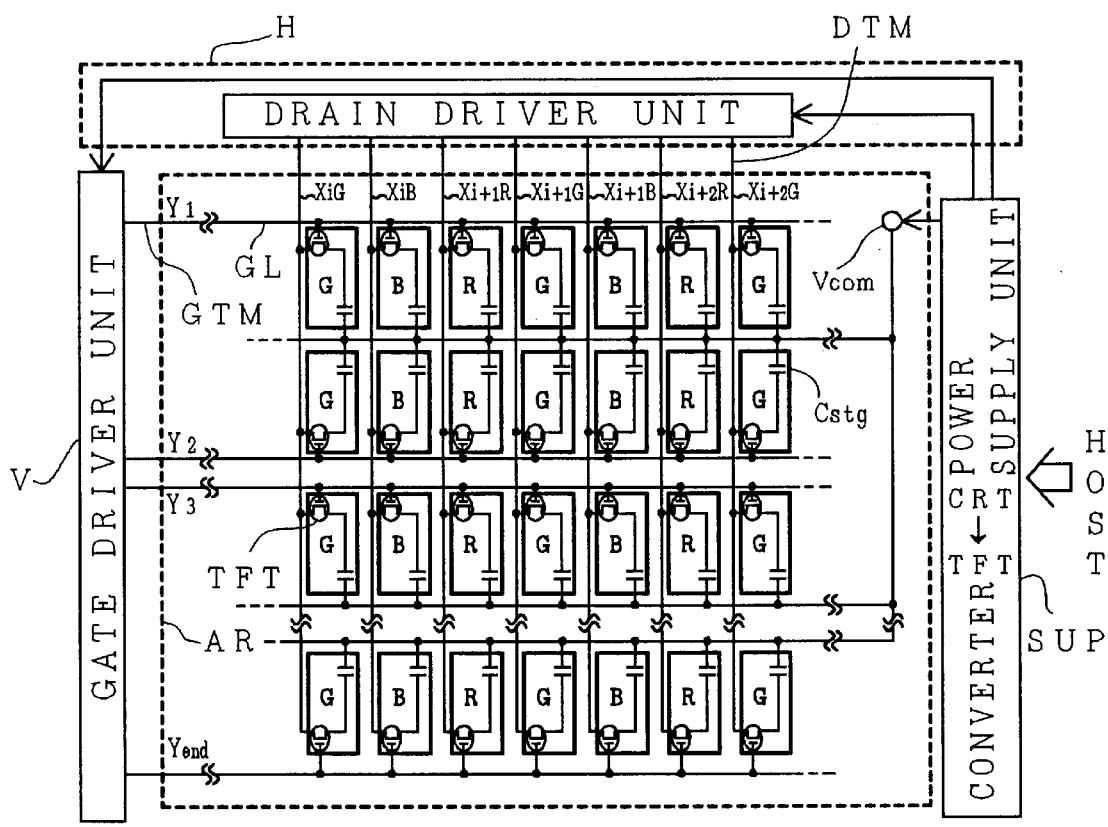
FIG. 10 is a diagram showing the connection of an equivalent circuit of a display matrix unit and the peripheral circuits in a liquid crystal display device.

FIG. 10 is a diagram illustrating the connection of an equivalent circuit of a display matrix unit in the liquid crystal display device of the present invention and the peripheral circuits.

In FIG. 10, symbol AR denotes a matrix array in which a plurality of pixels are two-dimensionally arranged, X denotes drain lines DL, and subscripts G, B, R denote pixels of green blue and red colors.

Symbol DTM denotes drain terminals, GTM denotes gate terminals, Y denotes gate lines GL, and subscripts 1, 2, 3, - - - , end are in the order of the scanning timings. The gate lines Y (subscripts are omitted) are connected to a gate driver unit V.

The drain lines X (subscripts are omitted) are connected to a drain driver unit H arranged along one of the long sides of the display panel, and terminals are led out from one side only of the liquid crystal display panel like the gate lines Y.

SUP includes a power supply unit for obtaining stabilized voltages as basic gray-scale levels whose voltages are generated by dividing the voltage of a voltage supply, and a converter for converting information for the CRT (cathode-ray tube) from a host (host arithmetic unit) into information for the TFT liquid crystal display device.

Figure 11:
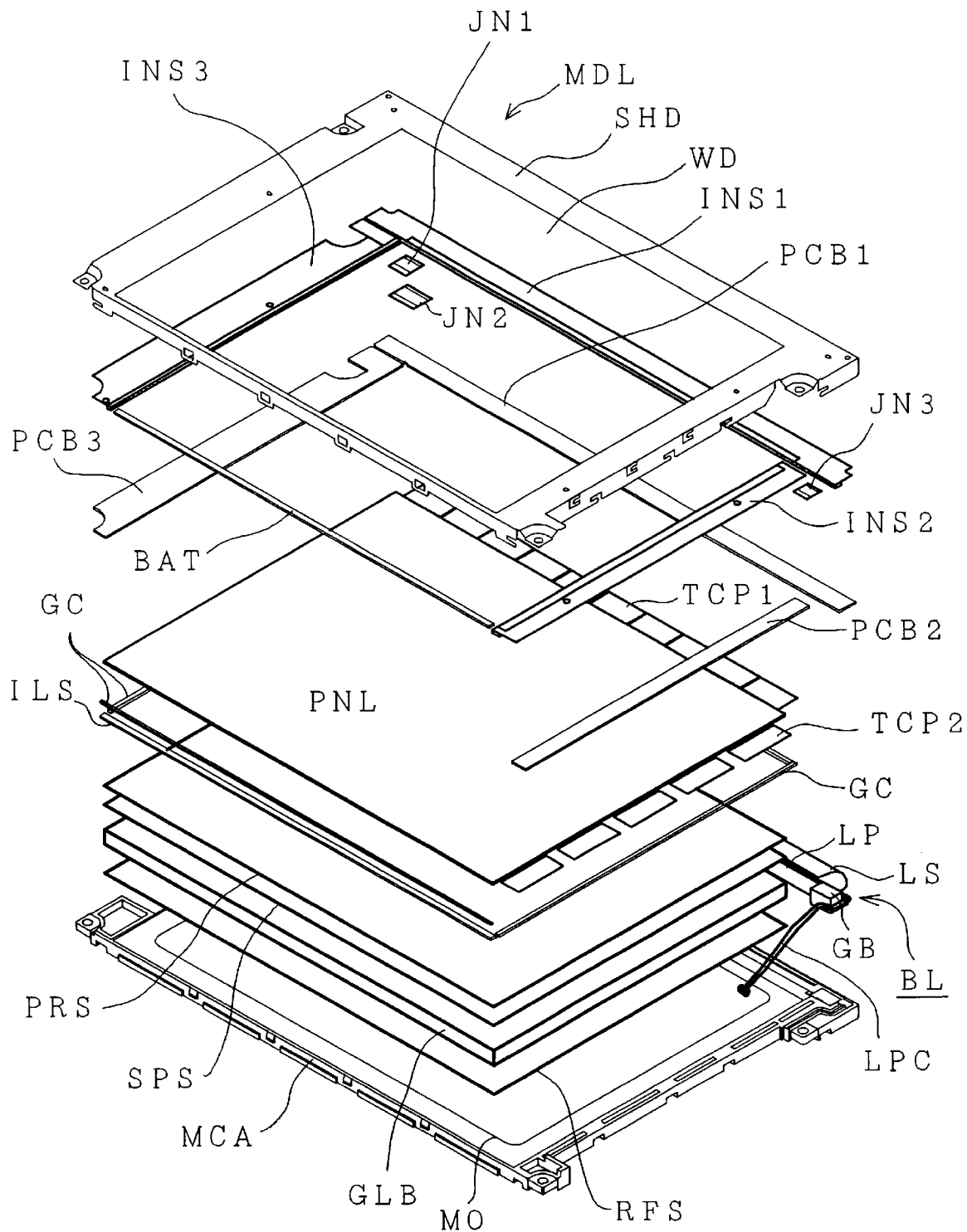
FIG. 11 is an exploded perspective view illustrating an example of the constitution of the liquid crystal display device according to the present invention.

FIG. 11 is an exploded perspective view illustrating the constitution of the liquid crystal display device according to the present invention, i.e., specifically illustrating the structure of the liquid crystal display device (hereinafter referred to as module in which the liquid crystal display panel, circuit board, backlight and other constituent members are combined as a unitary structure: MDL).

In FIG. 11, symbol SHD denotes a shielded case (also referred to as a metal frame) made of a metal plate, WD denotes a display window, INS1 to INS3 denote insulating sheets, PCB1 to PCB3 denote circuit boards (PCB1 is a circuit board on the drain side or a circuit board for drain driver, PCB2 is a circuit board on the gate side, PCB3 is an interface circuit board), JN1 to JN3 denote joiners for electrically connecting the circuit boards PCB1 to PCB3 together, TCP1 and TCP2 denote tape carrier packages, PNL denotes a liquid crystal display panel, GC denotes a rubber cushion, ILS denotes a light-shielding spacer, PRS denotes a prism sheet, SPS denotes a diffusion sheet, GLB denotes a light-guide plate, RFS denotes a reflection sheet, MCA denotes a lower case (molded frame) formed by one-piece molding, MO denotes an opening of the MCA, LP denotes a fluorescent lamp, LPC denotes a lamp cable, GB denotes a rubber bush for supporting the fluorescent lamp LP, BAT denotes a double-sided adhesive tape, and BL denotes a backlight comprising a fluorescent lamp, a light-guide plate and so on. Each part is stacked maintaining a relationship as shown thereby to assemble the liquid crystal display module MDL.

The liquid crystal display module MDL has two kinds of accommodating/holding members, i.e., a lower case MCA and a shielded case SHD. The metallic shielded case SHD accommodating and holding the insulating sheets INS1 to INS3, the circuit boards PCB1 to PCB3, and the liquid crystal display panel PNL is joined to the lower case MCA holding the backlight BL made up of the fluorescent lamp LP, the light-guide plate GLB, the prism sheet PRS and so on.

On the circuit board PCB1 for drain driver is mounted an integrated circuit chip for driving the pixels of the liquid crystal display panel PNL, and on the interface circuit board PCB3 are mounted an integrated circuit chip for receiving video signals from the external host and for receiving control signals such as timing signals, and a timing converter TCON for generating clock signals by processing timing signals.

The clock signals generated by the timing converter are fed to the integrated circuit chip mounted on the circuit board PCB1 for drain driver via a clock signal line CLL laid on the interface circuit board PCB3 and on the circuit board PCB1 for drain driver.

The interface circuit board PCB3 and the circuit board PCB1 for drain driver are multilayer wiring boards, and the clock signal line CLL is formed as an inner-layer wiring in the interface circuit board PCB3 and in the circuit board PCB1 for drain driver.

The circuit board PCB1 on the drain side for driving TFTs, the circuit board PCB2 on the gate side and the interface circuit board PCB3 are connected to the liquid crystal display panel PNL by tape carrier packages TCP1, TCP2, and the circuit boards are connected together by joiners JN1, JN2 and JN3.

The liquid crystal display panel PNL is an inplane electric field liquid crystal display device of the present invention, and the black mask formed on the color-filter substrate has a large resistivity so that an electric field pattern is formed between a pixel electrode and a common electrode almost in parallel with the interface of the liquid crystal layer.

Figure 12:
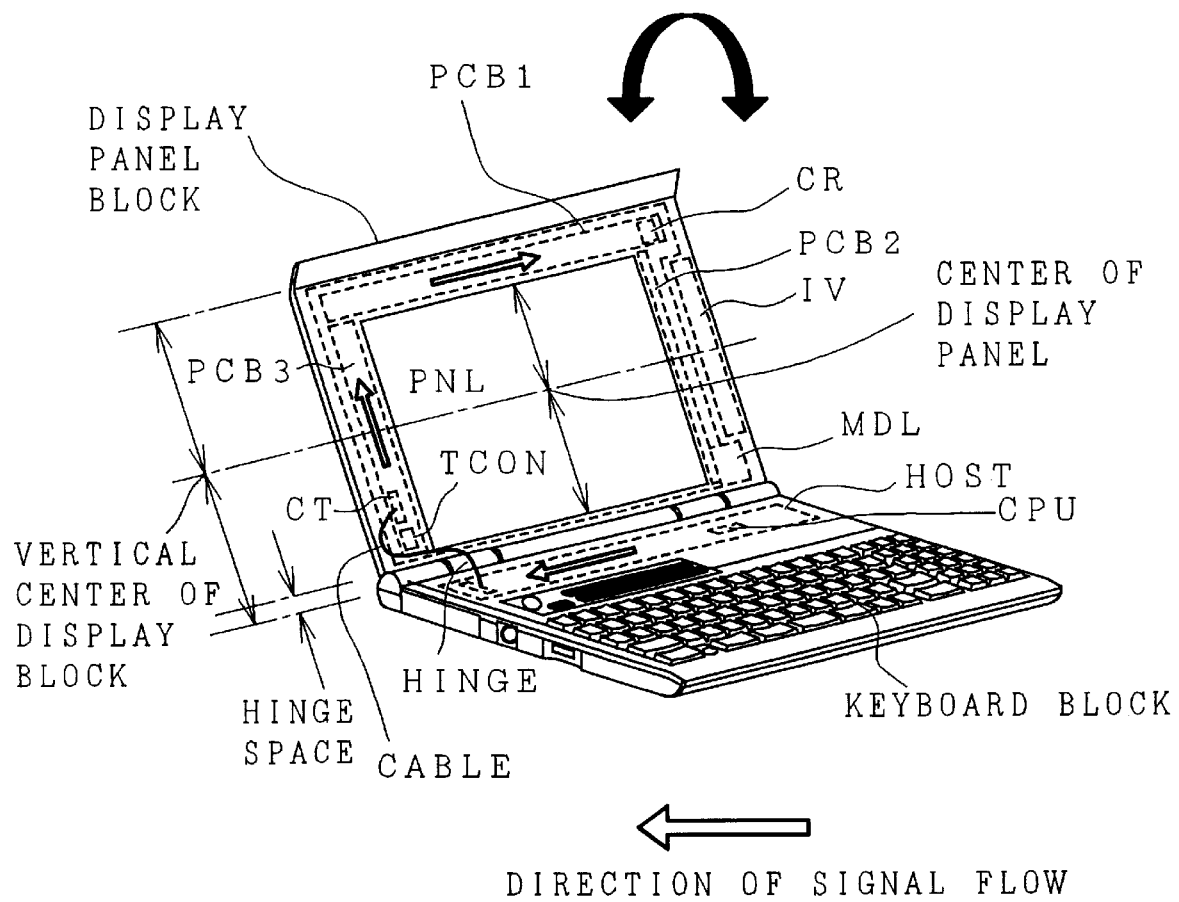
FIG. 12 is a diagram showing the appearance of a personal computer for explaining an information processing device in which a liquid crystal display device of the present invention is mounted.
Figure 13:
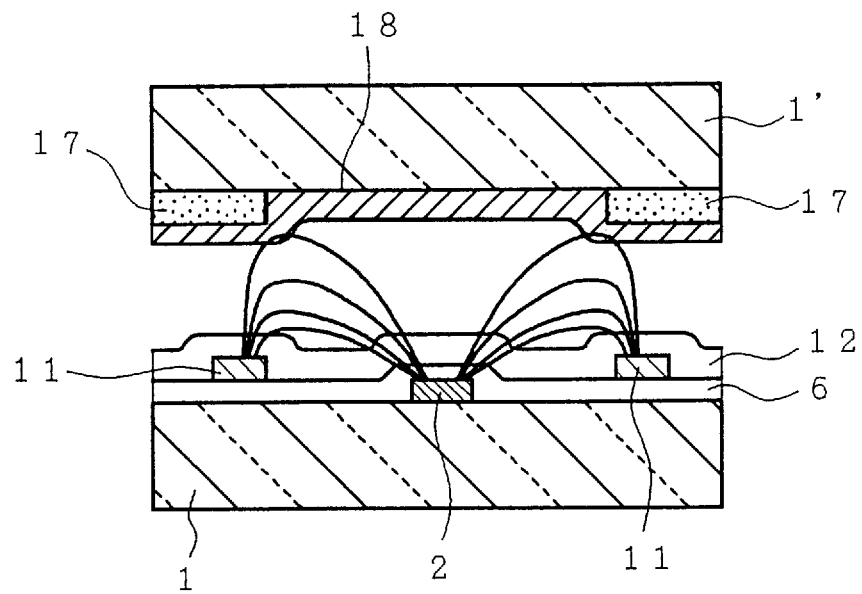
FIG. 13 is a sectional view for schematically illustrating the constitution of a pixel constituting an inplane electric field liquid crystal display device and for illustrating the turn-on operation.
Figures 14A, 14B:
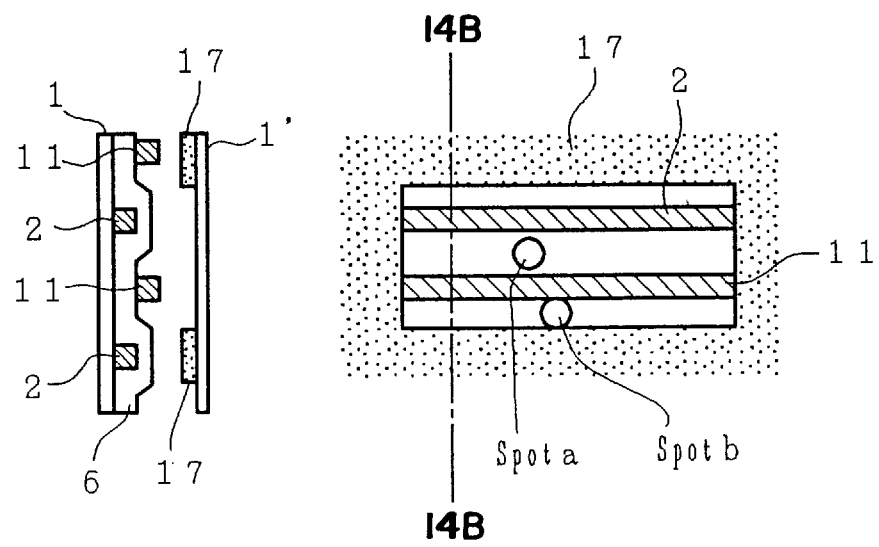
FIGS. 14A and 14B are schematic diagrams of a pixel in an inplane electric field liquid crystal display device in which two comb-toothed common electrodes are arranged in a pixel.
Figure 15:
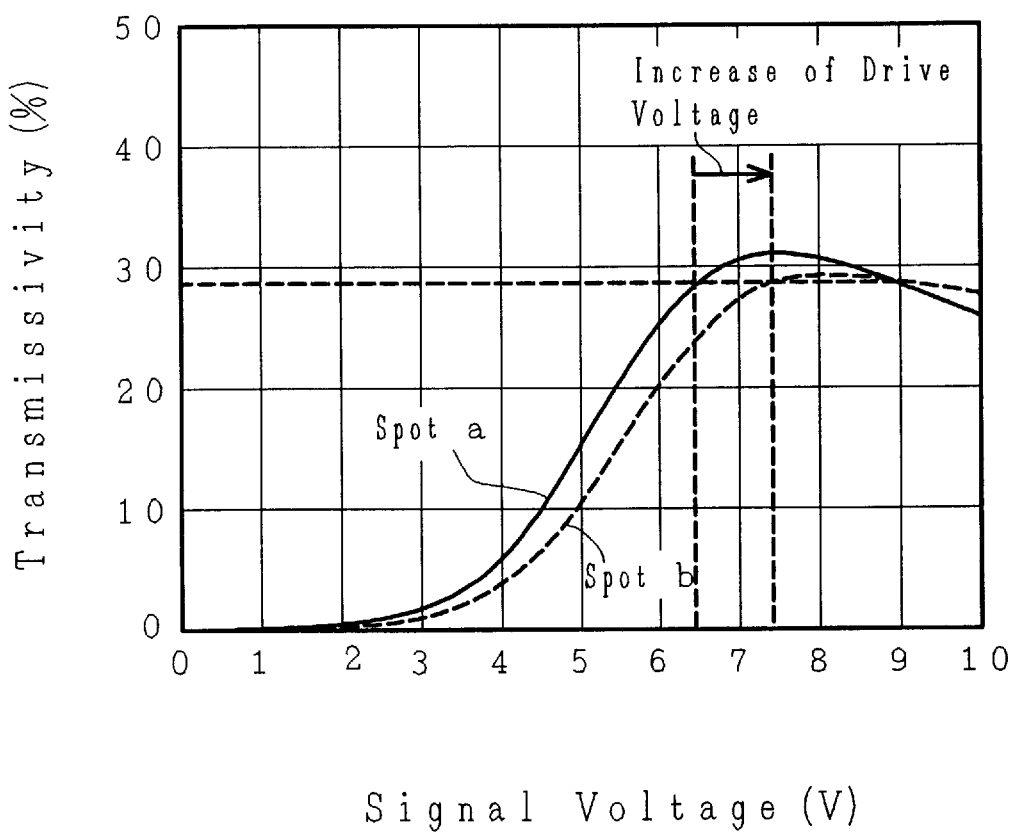
FIG. 15 is a diagram illustrating a change in the transmission factor depending upon the position in the gap between the pixel electrode and the common electrode shown in FIGS. 14A and 14B.

FIG. 12 is a diagram showing the appearance of a personal computer for explaining an information processing device having a liquid crystal display device of the present invention, wherein IV denotes an inverter power supply for driving a fluorescent lamp and CPU denotes a central processing unit on the host side.

As shown in FIG. 12, the personal computer equipped with the liquid crystal display device of the present invention has the circuit board for drain driver (circuit board for horizontal driver: circuit board on the drain side) PCB1 disposed at only the upper portion of the screen, leaving a margin in space on the lower side (keyboard side) of the display unit. Therefore, the space (hinge space) required to install hinges for coupling the keyboard unit and the display unit together can be small. This makes it possible to decrease the outer size of the display unit and, hence, to reduce the size of the personal computer as a whole.

According to the present invention as described above, the electric field created by the signal voltage in the so-called inplane electric field liquid crystal display device does hardly interfere with the black mask. Therefore, the electric field pattern formed by the selection voltage applied between the common electrode and the pixel electrodes is nearly in parallel with the interface between the liquid crystal layer and the orientation film, making it possible to suppress the rise of the drive voltage. Since the electric field pattern is not disturbed, the domains do not occur, and the liquid crystal display device has a high picture quality without nonuniformity in color.

The present invention is not limited to the liquid crystal display device of the TFT-type only but can be applied to the liquid crystal display devices of any other type inclusive of the active matrix type and the so-called simple matrix type.

In this embodiment, furthermore, the black mask is formed on one substrate side, and a group of electrodes are formed on the other substrate to generate an electric field nearly in parallel with the substrates. They, however, may be formed on the same substrate in compliance with the present invention, as a matter of course.

We claim:

1. A liquid crystal display device comprising a black mask formed on one of a pair of substrates at least one of which is transparent, a group of electrodes formed on at least one of said pair of substrates, a liquid crystal layer comprising a liquid crystal composition substance having a dielectric anisotropy and held between said pair of substrates, an orientation control film formed between said liquid crystal layer and one of said substrates for orienting liquid crystal molecules of said liquid crystal composition substance in a predetermined direction, a polarizing means laminated on at least one of said pair of substrates, and a drive means for applying a drive voltage to said group of electrodes, wherein said group of electrodes has a structure that the electrodes are so arranged as to generate an electric field having a component predominantly in parallel with the interface between said orientation control film and said liquid crystal layer, said liquid crystal composition substance has a resistivity of not smaller than $10^N$ Ω·cm, and said black mask has a resistivity of not smaller than $10^M$ Ω·cm, wherein N and M are integers satisfying the relationships $N \geqq 13$ and $M \geqq 7$.

2. A liquid crystal display device according to claim 1, wherein metal oxide particles are contained in said black mask.

3. A liquid crystal display device according to claim 2, wherein either or both of an organic pigment and a graphite powder in addition to said metal oxide particles are contained in said black mask.

4. A liquid crystal display device according to claim 2, wherein said metal oxide particles are particles of at least one of cobalt oxide, chromium oxide, manganese oxide and nickel oxide.

5. A liquid crystal display device according to claim 4, wherein said cobalt oxide particles are chiefly tricobalt tetroxide particles.

6. A liquid crystal display device according to claim 4, wherein any one of chromium oxide, manganese oxide and nickel oxide is contained in addition to said cobalt oxide.

7. A liquid crystal display device according to claim 1, wherein the base material of said black mask is made of a polyimide resin.

8. A liquid crystal display device according to claim 7, wherein said black mask is composed of a polyimide resin material which contains at least one or more kinds of black coloring agents and other coloring agents different from said black coloring agents.

9. A liquid crystal display device according to claim 7, wherein said black mask is composed of a polyimide resin material in which are mixed metal oxide particles as a black coloring agent.

10. A liquid crystal display device according to claim 7, wherein the composition of said polyimide resin material contains a component that is cured by light and a component that is cured by heat, and the optical density of said black mask increases as said resin material is cured by heat.

11. A liquid crystal display device according to claim 10, wherein said black mask is composed of a polyimide resin material which contains at least one or more kinds of black coloring agents and other coloring agents different from said black coloring agents.

12. A liquid crystal display device according to claim 10, wherein said black mask is composed of a polyimide resin material in which are mixed metal oxide particles as a black coloring agent.

* * * * *